(12) United States Patent
Sudau

(10) Patent No.: US 7,021,443 B2
(45) Date of Patent: Apr. 4, 2006

(54) CLUTCH SYSTEM

(75) Inventor: Jörg Sudau, Niederwern (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/489,746

(22) PCT Filed: Aug. 6, 2002

(86) PCT No.: PCT/EP02/08752

§ 371 (c)(1),
(2), (4) Date: Mar. 15, 2004

(87) PCT Pub. No.: WO03/036117

PCT Pub. Date: May 1, 2003

(65) Prior Publication Data

US 2004/0238312 A1     Dec. 2, 2004

(30) Foreign Application Priority Data

Oct. 19, 2001   (DE)   ................ 101 51 654

(51) Int. Cl.
*F16D 25/0638*   (2006.01)
(52) U.S. Cl. ................ 192/85 AA; 192/110 B; 192/115
(58) Field of Classification Search .......... 192/85 AA, 192/110 B, 112, 115
See application file for complete search history.

(56) References Cited

U.S. PATENT DOCUMENTS

| | | | |
|---|---|---|---|
| 2,178,017 A * | 10/1939 | Fedden et al. ......... | 192/86 |
| 2,880,834 A | 1/1959 | Gerst | |
| 4,899,861 A * | 2/1990 | Cummings, III ....... | 192/85 AA |
| 5,031,743 A * | 7/1991 | Morishita et al. ....... | 192/85 AA |
| 5,483,850 A | 1/1996 | Yamauchi | |
| 5,913,397 A | 6/1999 | Okada et al. | |
| 6,378,675 B1 | 4/2002 | Kundermann et al. | |
| 6,454,074 B1 | 9/2002 | Kundermann et al. | |
| 6,464,059 B1 | 10/2002 | Kundermann et al. | |
| 6,471,026 B1 | 10/2002 | Kundermann et al. | |
| 6,491,149 B1 | 12/2002 | Kundermann et al. | |
| 6,499,578 B1 | 12/2002 | Kundermann et al. | |
| 6,523,657 B1 | 2/2003 | Kundermann et al. | |
| 6,586,852 B1 | 7/2003 | Geiger et al. | |
| 2004/0245062 A1 | 12/2004 | Sudau | |

FOREIGN PATENT DOCUMENTS

DE        44 13 171       10/1995

(Continued)

OTHER PUBLICATIONS

Office Action dated Nov. 22, 2005 issued for the corresponding European Application No. 02 779 258.9, in German language-no translation.

*Primary Examiner*—Richard M. Lorence
(74) *Attorney, Agent, or Firm*—Cohen, Pontani, Lieberman & Pavane

(57) ABSTRACT

A clutch system, especially for a motor vehicle, includes a housing that is or can be filled with a fluid, at least one first friction element that is linked with the housing to rotate with the same, and at least one second friction element that is or can be linked with a drive shaft to rotate with the same. The clutch system is radially mounted relative components of a drive system in at least two radial bearing zones that are spaced apart from each other in the direction of a rotational axis.

6 Claims, 3 Drawing Sheets

FOREIGN PATENT DOCUMENTS

| | | |
|---|---|---|
| EP | 1 227 258 | 7/2001 |
| EP | 1 423 622 | 6/2004 |
| EP | 1 436 518 | 7/2004 |
| JP | 4-165122 | 6/1992 |

* cited by examiner

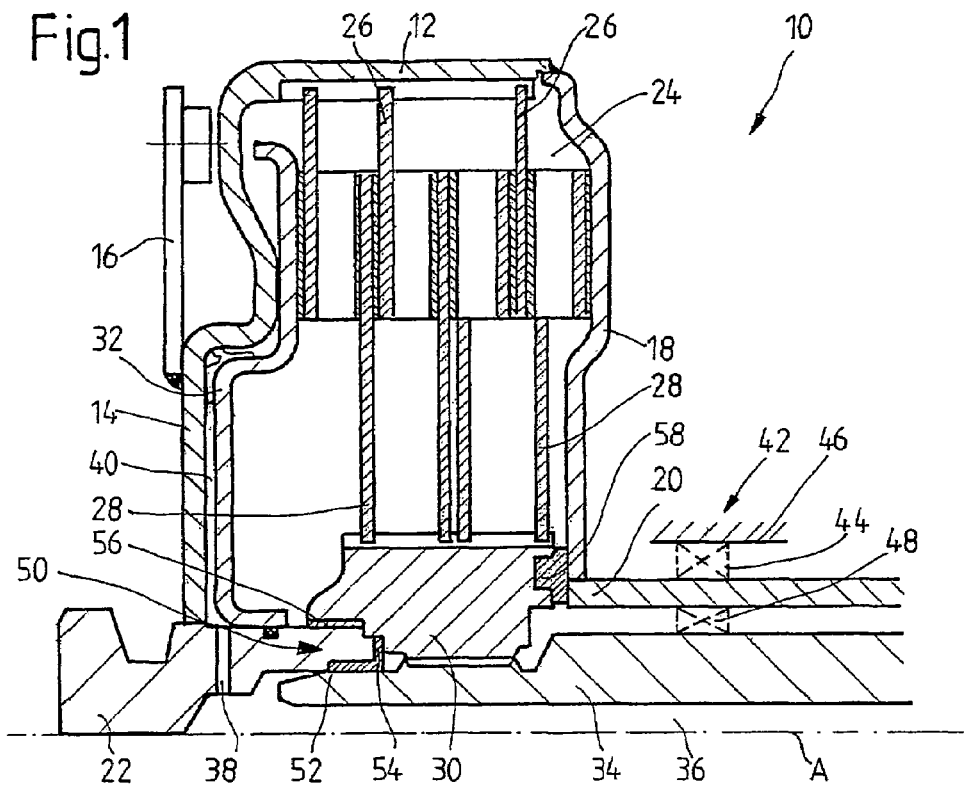
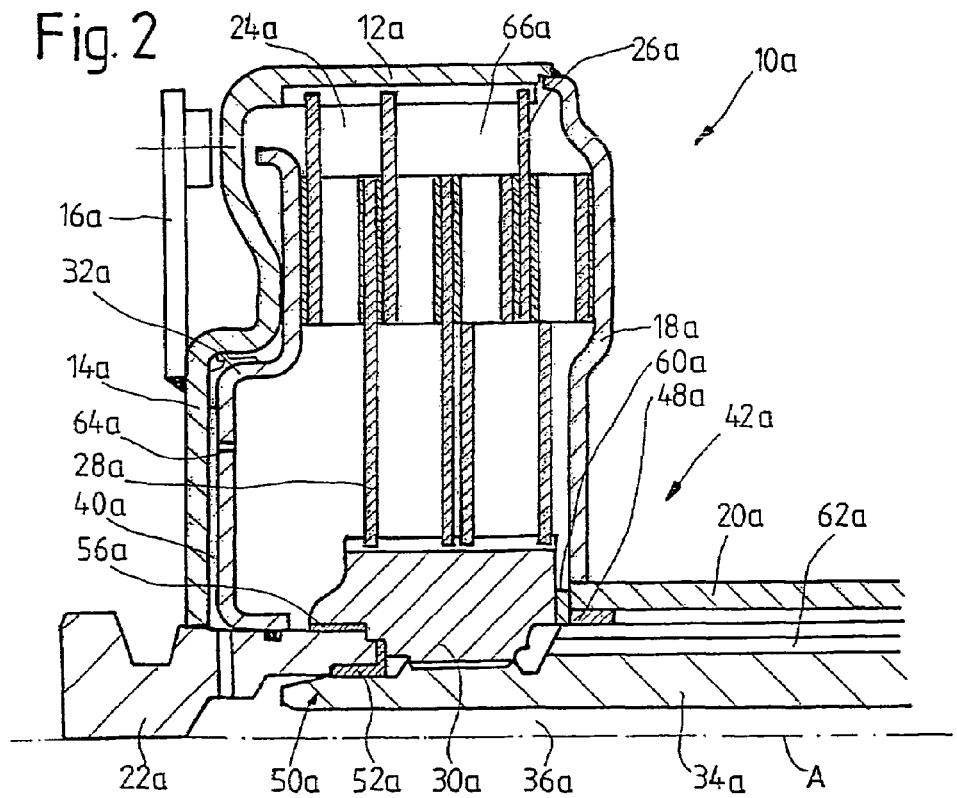

CLUTCH SYSTEM

PRIORITY CLAIM

This is a U.S. national stage of application No. PCT/EP02/08752, filed on 6 Aug. 2002. Priority under 35 U.S.C. §119(a) and 35 U.S.C. 365(b) is claimed from German Application No. 101 51 654.1, filed 19 Oct. 2001.

The present invention pertains to a clutch arrangement, especially for a motor vehicle, comprising a housing arrangement which is or can be filled with fluid; at least one first friction element, which is connected to the housing arrangement for rotation in common; and at least one second friction element, which is or can be connected to a takeoff shaft for rotation in common.

BACKGROUND OF THE INVENTION

1. Field of the Invention

These types of clutch arrangements, also called wet-running clutches, are installed in the same area of a drive system in which so-called dry friction clutches are installed, namely, between a takeoff unit and a gearbox, so that, as desired, a torque-transmitting connection can be established between a drive shaft of the drive unit, usually a crankshaft, and the gearbox input shaft, which represents the takeoff shaft. An essential problem in clutch arrangements of this type is that, because of various physical effects, it is possible for both axial forces, acting in the direction toward the drive unit, and radial forces to occur, which, in conjunction with any axial offsets or axial tilt which may be present, can lead to wobbling movements under continuous operating conditions.

2. Description of the Related Art

The task of the present invention is to design a clutch arrangement of the general type in question in such a way that, in spite of the various forces which occur during operation, the clutch arrangement will remain in its intended operating position.

Under a first inventive aspect, the clutch arrangement is supported radially with respect to components of the drive system in at least two radial support areas situated a certain distance apart in the direction of the axis of rotation.

As a result of the radial support provided in two areas offset axially from one another, an exact radial positioning is achieved, and at the same time the tilting of the overall clutch arrangement is prevented. It is therefore ensured that the clutch arrangement will remain exactly in its proper position, so that the occurrence of wobbling movements caused by tilting in particular can be excluded.

In the clutch arrangement according to the invention, it is possible, for example, for the housing arrangement to have a first housing hub on a side which is or can be positioned facing a gearbox, and for the first housing hub to be supported by a first radial support area. Because the takeoff shaft is usually a gearbox input shaft, and because this gearbox input shaft is held in a defined position in the gearbox itself, it is also proposed that the first housing hub be supported with respect to the takeoff shaft as one of the components supporting the clutch arrangement radially. Alternatively or in addition, it is obviously also possible for the first housing hub to be supported with respect to the gearbox housing as one of the components.

Especially when, as indicated above, a first support area is provided very close to the gearbox, it is possible in accordance with another advantageous aspect of the present invention for the housing arrangement to have a second housing hub on a side which is or can be positioned facing the drive unit, and for the second housing hub to be supported by a second radial bearing area. It is therefore ensured that the two radial bearing areas are relatively far apart from each other in the direction parallel to the axis of rotation and that therefore the support is stable and tilt-proof.

Here, too, it is again possible for the second housing hub to be supported with respect to the takeoff shaft as one of the components. It is obviously also possible as an alternative for the second housing hub to be supported with respect to the drive shaft of a drive unit as one of the components. A drive shaft of the type in question, especially the crankshaft of an internal combustion engine, is mounted in the internal combustion engine and thus held in a defined and fixed position in the overall drive system.

According to another aspect of the present invention, the task indicated above is accomplished by a clutch arrangement, especially for a motor vehicle, comprising a housing arrangement, which is or can be filled with fluid; at least one first friction element, connected to the housing arrangement for rotation in common; and at least one second friction element, which is or can be connected to a takeoff shaft for rotation in common.

It is then also provided that the clutch arrangement is or can be supported by means of an axial support arrangement with respect to the drive shaft of the drive unit. The axial support with respect to the drive shaft absorbs the previously mentioned axial forces, so that, for example, the elements serving to transmit torque are kept essentially free of axial forces and can fulfill their torque-transmitting function without interference from them. This is especially applicable when the torque-transmitting connection is accomplished by means of a dual-mass flywheel.

For example, in a design of this type, it is possible for the clutch arrangement to be supported on a secondary side of a torsional vibration damper by way of a first axial support area of the axial support arrangement and for the secondary side of the torsional vibration damper to be supported by way of a second axial support area of the axial support arrangement on a primary side of the torsional vibration damper. Because the secondary side is supported directly on the primary side, the area in which the torques are transmitted, namely, the area of the damper springs, is kept free of axial forces.

Alternatively or in addition, it is possible for the housing arrangement to be axially supported with respect to the drive shaft in the area of the housing hub. Here it is possible, for example, for the housing hub to be supported on a primary side of a torsional vibration damper arrangement which is rigidly connected to the drive shaft.

BRIEF DESCRIPTION OF THE DRAWINGS

FIG. 1 shows a partial longitudinal cross section through an inventive clutch arrangement according to a first embodiment;

FIG. 2 shows a view, corresponding to FIG. 1, of an alternative embodiment;

DETAILED DESCRIPTION OF THE PRESENTLY PERFERRED EMBODIMENTS

Figure 3:
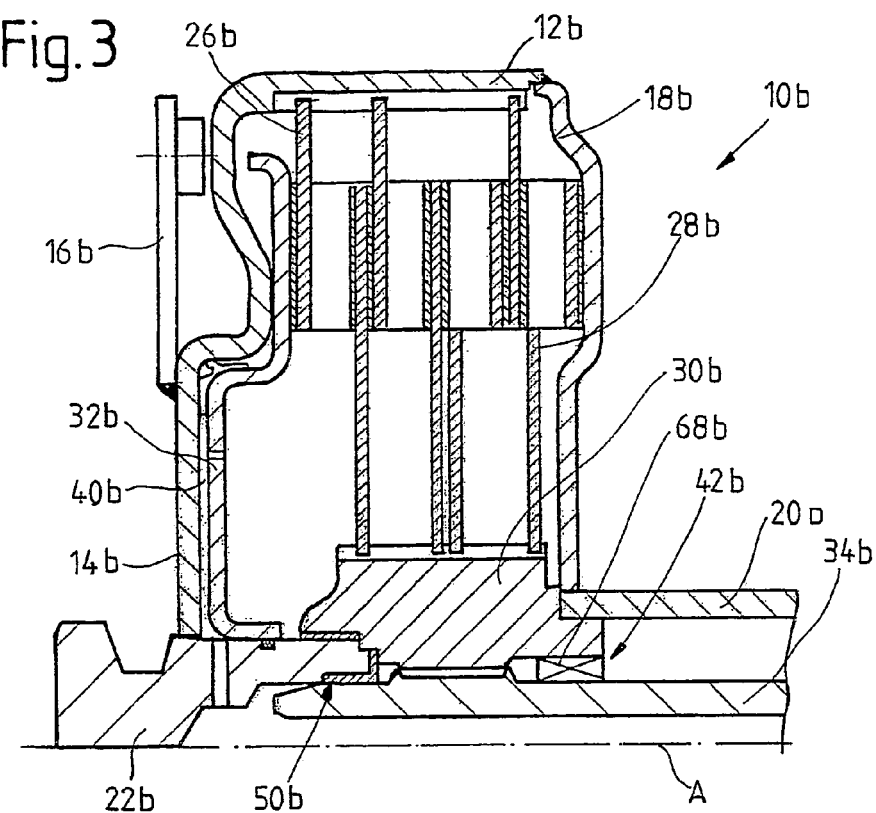
FIG. 3 shows another view, corresponding to FIG. 1, of an alternative embodiment of an inventive clutch arrangement.

FIG. 1 shows a clutch arrangement according to the invention, designated overall by the reference number 10. The clutch arrangement 10 comprises a housing arrangement 12, which carries a driver element 16 in the area of a first housing shell 14, to be positioned near the engine. By means of this driver element 16, it is possible, for example, with the use of a so-called flexplate or the like, to connect the housing arrangement nonrotatably to the drive shaft of a drive unit, such as, for example, a crankshaft. At the axially free end, a second housing shell 18 is connected to the first housing shell 14, the second shell being permanently connected in its radially inner area to a more-or-less cylindrical first housing hub 20, also referred to in general as the pump hub. The first housing shell 14 is permanently connected in its radially inner area to a second housing hub 22, also referred to in general as the drive hub.

In the interior space 24 enclosed by the housing arrangement 12, a plurality of first disks 26 is provided, which are connected nonrotatably but with freedom of axial movement to the housing arrangement 12 in a manner known in and of itself. In addition, several second disks 28 are provided, which are connected nonrotatably but with freedom of axial movement to a takeoff hub 30, provided in the radially inner area—with respect to an axis of rotation A—of the housing arrangement 12. It should be pointed out that the various disks 26, 28 can be of conventional design and that at least some of them can carry friction linings for mutual frictional interaction. A clutch piston 32, which is also provided in the housing interior 24, can be pushed by the force of a fluid in the axial direction with respect to the housing arrangement 12, in which case the various disks 26, 28 are brought into frictional interaction with each other and in addition are pressed against the housing arrangement 12 in the area near the gearbox. The torque-transmitting connection is thus established.

The takeoff hub 30 has a set of wedge-shaped teeth in its radially inner area, by which the hub can be brought into nonrotatable engagement with a complementary set of teeth on a takeoff shaft 34, usually serving as the gearbox input shaft. The gearbox input shaft 34 passes through the first housing hub 20, which is designed as a hollow shaft, in an essentially concentric manner and has in its radially inner area a pass-through opening 36, through which fluid can be introduced and then conducted via bores 38 in the drive hub 22 into a space 40 between the clutch piston 32 and the housing shell 14. In this way, a positive pressure can be produced in this space 40 to press the clutch piston 32 against the disks 26, 28.

It can also be seen in FIG. 1 that the clutch arrangement 10 is supported radially at two axially offset areas against components which are fixed parts of the drive system, that is, ultimately against components which are not considered part of the clutch arrangement itself. In a first radial support area 42, the clutch arrangement 10 is supported radially against the gearbox housing 46 by a radial bearing 44. This radial bearing 44 is located between the gearbox housing 46 and the first housing hub or pump hub 20. Alternatively or in addition, a radial bearing 48 in this first radial support area 42 can also be provided between the pump hub 20 and the gearbox input shaft 34. Because the gearbox input shaft 34 can rotate in a drive system but can otherwise be considered a fixed component, it is possible in this way to support the clutch arrangement 10 in the radial direction in the area close to the gearbox.

A second radial support area 50 is provided on the side of the clutch arrangement 10 facing the drive unit. A radial bearing 52 is provided in this second radial support area 50, on which bearing the second housing hub or drive hub 22 is radially supported against the gearbox input shaft 34. Whereas the two previously mentioned radial bearings 46, 48 can be designed as roller bearings or even as plain bearings, the radial bearing 52 is preferably designed as a plain bearing or plain bearing bush, which, by means of its radial extension 54, simultaneously provides axial support for the takeoff hub 30 against the housing arrangement 12, here the housing hub 22. The takeoff hub 30 is supported radially on the housing hub 22 by another radial bearing 56. The previously mentioned gear tooth-like engagement between the takeoff hub 30 and the gearbox input shaft 34 also contributes to the radial support of the takeoff hub. The axial support of the takeoff hub 30 in the other axial direction, that is, on the gearbox side, is accomplished by a plain bearing ring 58, which can be supported on the housing shell 18 and against the axial end of the housing hub 20.

It can be seen in FIG. 1 that the gearbox input shaft 34 is used as the essential component which provides the radial support for the entire clutch arrangement 10. Especially when the two radial bearings 52, 48 are used, all of the radial support can be accomplished on the gearbox input shaft 34. This arrangement offers the advantage that a comparatively short housing hub 20 can be used.

In the embodiment shown in FIG. 1, the axial forces which occur during operation and are directed toward the drive unit—forces which are produced essentially by the support pressure exerted in the radially inner area against the gearbox arrangement—are absorbed by the flexplate, which also provides the nonrotatable connection, or by some other connecting element.

A modified embodiment is shown in FIG. 2. Components which are the same as those described above with respect to design and function are designated by the same reference numbers plus the letter "a". The essential design differences will be discussed below.

It can be seen that, in the first radial support area 42a, the radial bearing 48a is designed as a plain bearing bush situated between the housing hub or pump hub 20a and the gearbox input shaft 34a. The radial bearing 48a has a flange-like, radially-outward-projecting area 60a, which simultaneously forms the axial bearing for the takeoff hub 30a. This flange-like section 60a can be divided into several segments in the circumferential direction to allow fluid exchange between the interior space 24a of the housing arrangement 12a and the fluid channels 62a, which are provided in the gearbox input shaft 34a eccentrically with respect to the axis of rotation A. It can be seen that the design shown in FIG. 2 is of the so-called "two-line" type, in which, for example, the fluid passes through the central opening 36a in the gearbox input shaft 34a and into the space 40a to engage the clutch; the fluid can then leave this space 40a through one or more throttle openings 64a and thus arrive in a space 66a, which contains essentially the disks 26a, 28a. The fluid can then leave this space through the previously mentioned fluid channels 62a. If the clutch arrangement 10a is to be disengaged, the direction in which the fluid flows is reversed.

It should be pointed out that, of course, these types of fluid flow arrangements can also be provided in the embodiment according to FIG. 1 and in the embodiments to be described further below according to FIGS. 3–5; when, for example, the channels 62a, which can be seen in FIG. 2, are not present, the fluid can leave or be supplied through the space formed between the pump hub and the gearbox input shaft.

Another alternative embodiment of the clutch arrangement according to the invention is shown in FIG. 3. Components which are the same as those previously described with respect to design and function are designated by the same reference numbers plus the letter "b".

Whereas the design of the second bearing area 50b is the same as that described above in reference to FIGS. 1 and 2, it can be seen that the first support area 42b now has a radial bearing 68b, which is positioned between the takeoff hub 30b and the gearbox input shaft 34b at the end of the takeoff hub 30b to be positioned facing the gearbox. In addition, the housing hub or pump hub 20b, possibly with an intermediate antifriction coating, is supported directly in the radial direction against the housing arrangement 12b or against the takeoff hub 30b. At the same time, an axial support for the takeoff hub 30b can also be provided here. The housing arrangement 12b is thus again supported directly against the gearbox input shaft 34b at two different radial support areas 42b, 50b a certain axial distance apart.

Whereas primarily the radial support of a clutch arrangement with respect to other components of a drive system which can be considered fixed has been described above with reference to FIGS. 1–3, in the following it is essentially the aspect of axial support which is to be discussed below with reference to FIGS. 4 and 5. It should be pointed out that, in the embodiments described below, the aspect of radial support can be realized in whole or in part as previously described.

Figure 4:
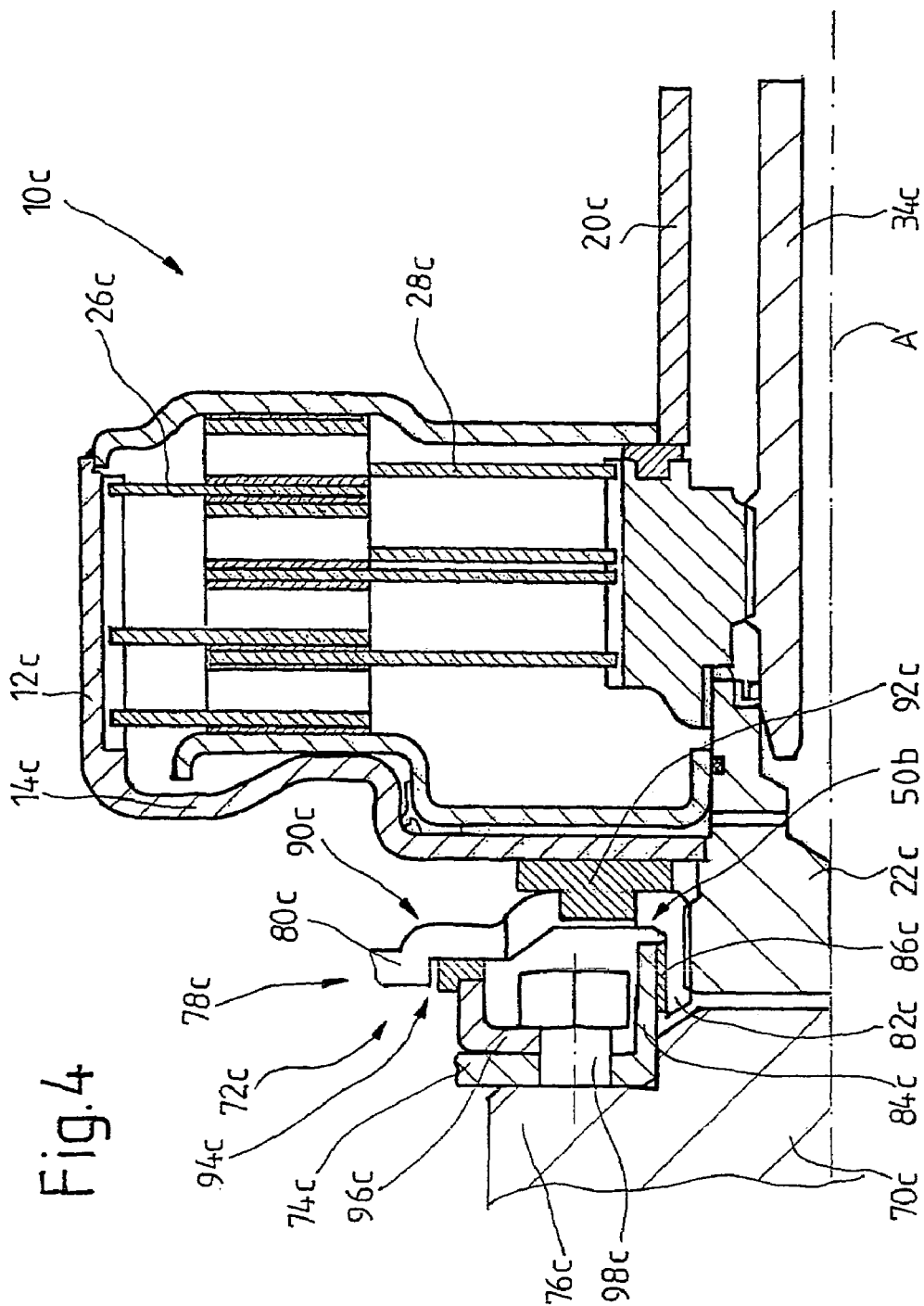
FIG. 4 shows another view, corresponding to FIG. 1, of an alternative embodiment of the inventive clutch arrangement.

In the embodiment shown in FIG. 4, components which are the same as those previously described with respect to design or function are designated by the same reference numbers plus the letter "c".

It can be seen that the clutch arrangement 10c is connected to a drive shaft 70c by a torsional vibration damper 72c, only the radially inner area of which is shown and which is designed as a so-called dual-mass flywheel.

This damper can be of conventional design and can comprise, for example, two cover disk elements as the primary side, one of which is designated 74c in FIG. 4, and which is fastened radially on the inside to the drive shaft 70c. Radially on the outside, the two cover disk elements are a certain axial distance apart and are connected rigidly to each other. These cover disk elements 74c also form essentially the primary side 76c of the torsional vibration damper 72c. The secondary side 78c comprises essentially a central disk element 80c, the radially outer area of which engages between the two previously described cover disk elements and is connected to these elements for the transmission of torque by several damper springs distributed around the circumference.

In its radially inner area, the central disk element 80c has an essentially cylindrical section 82c, the inside surface of which has a set of teeth by which it engages for rotation in common with a corresponding set of external teeth on the drive hub 22c. In this way, the housing arrangement 12c is connected nonrotatably to the secondary side 78c of the torsional vibration damper 72c. Between an essentially cylindrical section 84c of the cover disk element 74c and the cylindrical section 82c of the central disk element 80c, a radial bearing 86c, designed, for example, as a plain bearing bush, is situated, which supports the primary side 76c radially with respect to the secondary side 78c and simultaneously forms all or part of the second radial support area 50b.

It can also be seen that the housing arrangement 12c is supported by an axial bearing arrangement 90c against the drive shaft 70c. The axial support arrangement 90c comprises a first axial support area 92c, designed, for example, as a plain bearing ring. This area can, for example, be connected nonrotatably to, and centered on, the central disk element 80c by several axial projections, and it can be in sliding contact with the housing shell part 14c. These axial projections can, for example, fit into the assembly holes in the central disk element 80c, through which access can be obtained to the screw bolts 98c serving to fasten the torsional vibration damper 72c to the drive shaft 70c. A second axial bearing area 94c also comprises, for example, a plain bearing ring, which is supported axially against a support ring or element 96c, which is attached together with the cover disk element 74c to the drive hub 80c, the central disk element 80c being supported axially against this bearing ring. There is a thus a direct axial flow of force from the housing arrangement 12c, via the first axial support area 92c, the central disk element 80c, the second axial support area 94c, the element 96c, and the cover disk element 74c to the drive shaft 70c. The area farther outward in the radial direction, i.e., the area which serves to transmit the torque and in which the previously mentioned damper springs are positioned, is thus kept essentially free of axial forces and can therefore fulfill the torque-transmitting function and also the vibration-damping function in a manner essentially unimpaired by axial forces. At the same time, the various axial support areas form friction areas, which can contribute to the damping of vibrations in the manner of a dry friction device.

Figure 5:
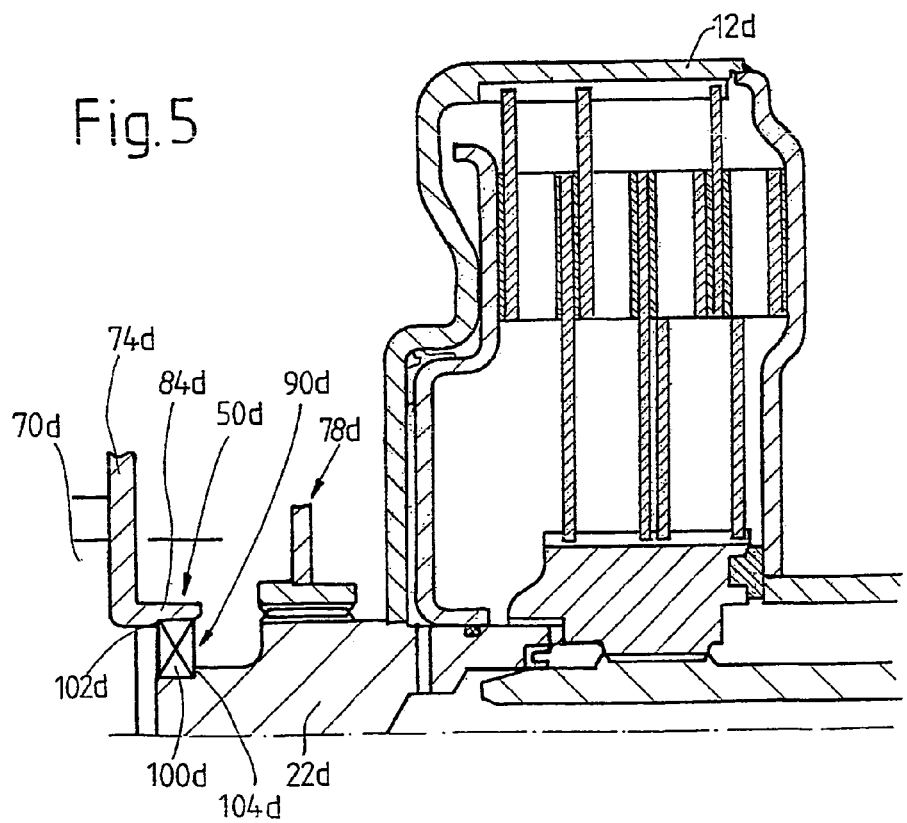
FIG. 5 shows another view, corresponding to FIG. 1, of an alternative embodiment of the inventive clutch arrangement.

Another modified embodiment is shown in FIG. 5. Components which are the same as those described above with respect to design or function are designated by the same reference numbers plus the letter "d".

In the variant shown in FIG. 5, the axial support arrangement 90d comprises a combined axial/radial bearing 100d. This is located between the housing hub or drive hub 22d and the essentially cylindrical section 84d of the previously described cover disk element 74d. So that the axial forces can be transmitted toward the drive unit, radial shoulders 102d, 104d are provided, one on the cylindrical section 84d and one on the drive hub 22d. The bearing, designed, for example, as a roller bearing, can thus be supported in the axial direction against these shoulders. The bearing therefore assumes not only the function of transmitting the axial forces, but also the function of providing radial support for the housing arrangement 12d in the area located close to the drive unit and thus forms at least part of the radial support arrangement 50d. In this embodiment, too, the torsional vibration damper, shown only in schematic fashion, is kept essentially free of both axial and radial forces, so that it can fulfill its vibration-damping function without interference from the effects of these forces.

It should be pointed out that, in the previously described embodiments, the radial support in the area near the drive shaft can also be provided by radially supporting the drive hub of the housing arrangement on the drive shaft itself in a corresponding manner. For this purpose, the drive shaft can have a central opening, into which the drive hub engages by way of an appropriate intermediate bearing element. Of course, axial support can also be provided in this way as well.

What is claimed is:

1. A clutch arrangement for a motor vehicle between a drive system and a gearbox, the clutch arrangement comprising:

a housing arrangement fillable with fluid and having an axis of rotation, the housing arrangement being fixed with respect to rotation to a drive shaft of the drive system, the housing arrangement having:
  at least one first friction element in the housing arrangement for rotation in common with the drive shaft of the drive system;
  at least one second friction element which can be connected to a takeoff shaft of the gearbox for rotation in common about the axis of rotation;
  a first radial support area on a first side of the housing arrangement facing the drive system;
  a second radial support area on a second side of the housing arrangement facing the gearbox, the first and second radial support areas being axially spaced from one another;
  a first housing hub supported in the first radial support area;
  a second housing hub supported in the second radial support area and axially spaced from the first hub support;
  a take-off hub between the first and second housing hubs, the take-off hub being coupled to the second friction element; and
  an axial support in the first radial support area on the first side of the housing arrangement for axially supporting the takeoff shaft relative to the first hub of the housing arrangement.

2. A clutch arrangement for a motor vehicle, the clutch arrangement comprising:
  a housing arrangement which can be filled with fluid;
  at least one first friction element connected to the housing arrangement for rotation in common;
  at least one second friction element which can be connected to a takeoff shaft for rotation in common; and
  an axial support arrangement for supporting the clutch arrangement axially with respect to a drive shaft of a drive unit, the axial arrangement comprising a first axial support area and a second axial support area, the clutch arrangement further comprising a torsional vibration damper having a secondary side supported by the first axial support area and a primary side supported by the second axial support area.

3. A clutch arrangement for a motor vehicle, comprising:
  a housing arrangement which can be filled with fluid;
  at least one first friction element connected to the housing arrangement for rotation in common;
  at least one second friction element which can be connected to a takeoff shaft for rotation in common;
  an axial support arrangement for supporting the clutch arrangement axially with respect to a drive shaft of a drive unit;
  a housing hub supporting the housing arrangement axially with respect to the drive shaft; and
  a torsional vibration damper having a primary side and a secondary side, the primary side being rigidly fixed to the drive shaft, the housing hub being supported on the primary side of the torsional vibration damper.

4. The clutch arrangement of claim 1, further comprising a radial bearing in the second radial support area, the radial bearing supporting the second housing hub with respect to the takeoff shaft.

5. The clutch arrangement of claim 1, further comprising a flange in the second radial support area, the flange extending radially outwards from the axis of rotation and spaced axially from the axial support so as to axially support the take-off hub at the second side of the housing facing the gearbox.

6. The clutch arrangement of claim 1, further comprising a radial bearing in the second radial support area, the take-off hub being located between the radial bearing and the second housing hub so that the second housing hub acts upon the radial bearing via the take-off hub.

* * * * *